United States Patent Office 3,547,685
Patented Dec. 15, 1970

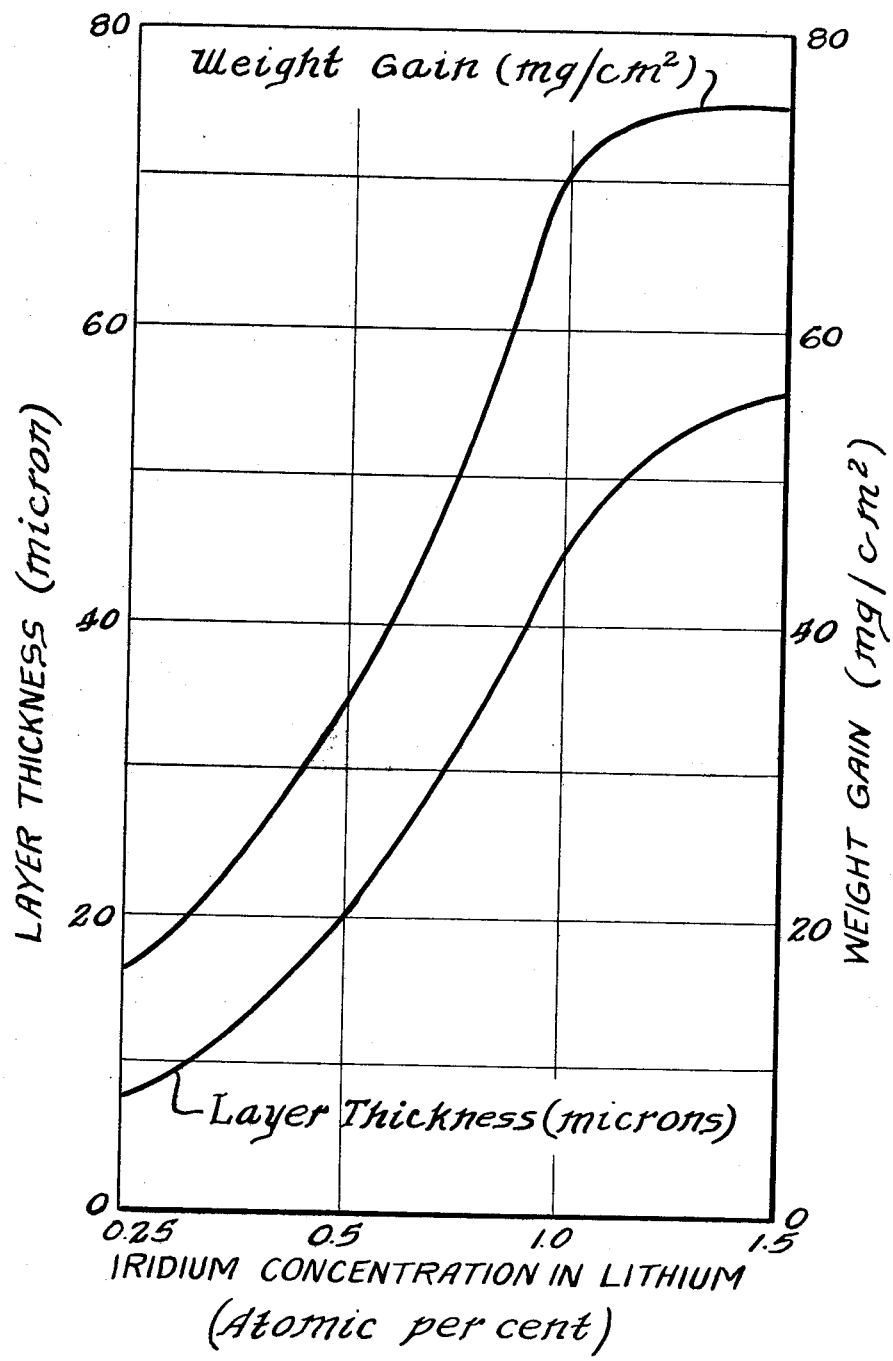

3,547,685
METHOD OF INHIBITING THE CORROSION OF TANTALUM BY LIQUID LITHIUM
James Y. N. Wang, Lockport, and Kenneth G. Figlik, Downers Grove, Ill., assignors to the United States of America as represented by the United States Atomic Energy Commission
Filed Aug. 21, 1968, Ser. No. 754,308
Int. Cl. C23c 1/10; G21c 15/28
U.S. Cl. 117—114
3 Claims

ABSTRACT OF THE DISCLOSURE

A method of inhibiting the corrosion of tantalum by liquid lithium at high temperatures by adding 0.25 to 1.5 atom percent iridium to the lithium.

CONTRACTUAL ORIGIN OF THE INVENTION

The invention described herein was made in the course of, or under, a contract with the United States Atomic Energy Commission.

CROSS REFERENCES TO RELATED APPLICATIONS

This invention is an improvement on patent application S.N. 625,908, filed Mar. 22, 1967 in the name of James Y. N. Wang, now Pat. No. 3,494,805, issued Feb. 10, 1970.

BACKGROUND OF THE INVENTION

This invention relates to the reduction in corrosion of a metal used as a structural material in a liquid-metal-cooled reactor and more particularly to the inhibition of corrosion of tantalum by liquid lithium at high temperatures.

Lithium is in many ways the choice among all metals for use as the coolant in a liquid-metal-cooled reactor and in fact it has been selected as the coolant for the SNAP–50 reactor. Reasons for its choice include the widest liquid range of all of the alkali metals (180–1372° C.), low density, good thermal conductivity, low viscosity and an acceptable neutron absorption cross section. However, at temperatures above 1000 C., commercially pure tantalum is susceptible to lithium attack. The severity increases with increasing contamination of both liquid and solid and with increasing temperature.

SUMMARY OF THE INVENTION

The invention accordingly comprises a method of preventing intergranular corrosion and microcracking of tantalum when in contact with lithium at high temperatures. This is accomplished by adding between 0.25 and 1.5 atom percent iridium to the lithium. This small amount forms a diffusion barrier containing tantalum and iridium which prevents further corrosion and eliminates microcracking.

BRIEF DESCRIPTION OF THE DRAWING

The figure is a graph showing the behavior of tantalum specimens in contact with lithium as a function of iridium concentration in the lithium.

DESCRIPTION OF THE PREFERRED EMBODIMENT

A number of experiments were carried out to show advantages of the present invention and to delineate the metes and bounds of the invention. These tests were carried out by introducing 3.5 grams of lithium containing a small proportion of iridium into capsules 4" x ½" I.D. formed of high-purity tantalum and heating the capsules at 1200° C.±15° C. under a purified helium atmosphere for nine days. Mixtures of lithium and iridium containing 0.25, 0.50, 1.00, and 1.50 atom percent iridium were tested. Each mixture, with two small tantalum inserts, was electron beam sealed into a tantalum capsule.

Metallographic examination of exposed tantalum specimens showed that the surface of the material was penetrated during the initial period of the test. However, an intermetallic compound was formed in the attacked areas and this layer prevented further attack. Penetration of tantalum by lithium can thus be prevented as long as the liquid lithium contains a concentration of iridium adequate for the formation of the tantalum-iridium intermetallic compound. The layer formed is $50\mu$ deep and thus positively protects the tantalum from penetrating lithium attack. The thickness of the layer formed by employing iridium as corrosion inhibitor may be contrasted with the layer formed using silicon as corrosion inhibitor—$4\mu$—as taught in patent application S.N. 625,908, supra.

Presence of an intermetallic layer was confirmed by measuring the microhardness of the layer with a Knoop Microhardness Tester. The tester was used at a constant load of 50 g. and showed a microhardness number 300 to 1000 higher than that of tantalum. This indicates that tantalum and iridium are alloyed in the layer.

The tantalum and iridium distribution within the layer as a function of distance across the layer was analyzed by an electronmicroprobe technique. Results showed that there were three phases present in the layer. The tantalum concentration present in the outermost portion was about 29 weight percent tantalum, which corresponds approximately to the $TaIr_3$ phase; the intermediate portion had a concentration of about 52 weight percent tantalum, which clearly approaches the $TaIr$ phase; and the innermost portion, adjacent to the pure tantalum, had a concentration of about 77 weight percent tantalum and is believed to be the $Ta_3Ir$ phase.

FIG. 1, which shows the layer growth and weight gain of tantalum specimens as a function of iridium concentration in the lithium, shows that up to about 1 atom percent iridium, the layer thickness and weight gain increases with increasing iridium concentration. Since the 1 atom percent iridium solution produced a protective layer lower in microhardness than layers produced by the other solutions, this is believed to represent an optimum solution concentration.

It will be understood that the invention is not to be limited to the details given herein but that it may be modified within the scope of the appended claims.

The embodiments of the invention in which an exclusive property or privilege is claimed are defined as follows:

1. A method of inhibiting the corrosion of tantalum by liquid lithium at high temperatures comprising adding between 0.25 and 1.50 atom percent iridium to the lithium.

2. A method according to claim 1 wherein the temperature is about 1200° C.

3. A method according to claim 2 wherein 1.0 atom percent iridium is added to the lithium.

References Cited

UNITED STATES PATENTS

| | | | |
|---|---|---|---|
| 3,265,526 | 8/1966 | Beer | 117—35X |
| 3,342,628 | 9/1967 | Sinclair | 117—114 |
| 3,413,142 | 11/1968 | Lemke | 117—114X |
| 3,481,770 | 12/1969 | Lemke | 117—114 |
| 3,494,805 | 2/1970 | Wang | 148—6.11 |

RALPH S. KENDALL, Primary Examiner

U.S. Cl. X.R.

29—198; 176—92